United States Patent [19]

Bertrand et al.

[11] Patent Number: 6,011,850
[45] Date of Patent: *Jan. 4, 2000

[54] SECURIZED, MULTIFUNCTION, ACQUISITION AND PROCESSING TERMINAL USABLE IN THE BANKING SECTOR, IN CONNECTION WITH GAMES AND IN THE ELECTRONIC MANAGEMENT OF DOCUMENTS

[75] Inventors: Dominique Bertrand; Jean-Marie Gatto, both of Paris, France

[73] Assignees: Jean-Marie Gatto, London, United Kingdom; Dominique Bertrand, Morley, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/558,217

[22] Filed: Nov. 17, 1995

[30] Foreign Application Priority Data

Nov. 23, 1994 [FR] France ................................. 94 14020

[51] Int. Cl.[7] .............................. G09C 1/12; H05K 7/14; H05K 5/00
[52] U.S. Cl. ......................... 380/59; 361/800; 361/684; 361/724
[58] Field of Search .................................. 380/59, 52, 4, 380/49, 50; 361/796, 730, 736, 800, 818, 683, 684, 685, 724, 725; 174/35 R, 35 GC

[56] References Cited

U.S. PATENT DOCUMENTS

| | | | |
|---|---|---|---|
| 4,352,952 | 10/1982 | Boone et al. | 178/22.09 |
| 4,744,006 | 5/1988 | Duffield | 361/413 |
| 4,882,779 | 11/1989 | Rahtgen | 380/24 |
| 5,148,481 | 9/1992 | Abraham et al. | 380/46 |
| 5,296,748 | 3/1994 | Wicklund et al. | 307/303.1 |
| 5,297,201 | 3/1994 | Dunlavy | 380/6 |
| 5,301,231 | 4/1994 | Abraham et al. | 380/4 |
| 5,325,430 | 6/1994 | Smyth et al. | 380/4 |
| 5,331,434 | 7/1994 | Kikinis | 358/474 |
| 5,365,466 | 11/1994 | Hazard | 364/717 |
| 5,389,738 | 2/1995 | Piosenka et al. | 174/52.4 |
| 5,410,599 | 4/1995 | Crowley et al. | 380/9 |
| 5,412,730 | 5/1995 | Jones | 380/46 |
| 5,416,610 | 5/1995 | Kikinis | 358/474 |
| 5,468,952 | 11/1995 | Alexander et al. | 235/492 |
| 5,490,283 | 2/1996 | Chin | 395/893 |
| 5,514,861 | 5/1996 | Swartz et al. | 235/472 |
| 5,517,569 | 5/1996 | Clark | 380/52 |
| 5,532,844 | 7/1996 | Kagami et al. | 358/468 |
| 5,539,828 | 7/1996 | Davis | 380/50 |
| 5,546,463 | 8/1996 | Caputo et al. | 380/25 |
| 5,568,552 | 10/1996 | Davis | 380/4 |
| 5,584,023 | 12/1996 | Hsu | 395/620 |
| 5,633,934 | 5/1997 | Hember | 380/50 |
| 5,656,795 | 8/1997 | Miska | 174/35 GC |
| 5,666,530 | 9/1997 | Clark et al. | 395/617 |

FOREIGN PATENT DOCUMENTS

| | | |
|---|---|---|
| 0339154 | 11/1989 | European Pat. Off. . |
| 08/487113 | 5/1992 | European Pat. Off. . |
| 0508869 | 10/1992 | European Pat. Off. . |
| 0587484 | 3/1994 | European Pat. Off. . |
| 2407518 | 5/1979 | France . |
| 2664138 | 1/1992 | France . |

*Primary Examiner*—Gail O. Hayes
*Assistant Examiner*—Hrayr A. Sayadian
*Attorney, Agent, or Firm*—Pearne, Gordon, McCoy & Granger LLP

[57] ABSTRACT

The present invention relates to a securized, multifunction, acquisition and processing terminal more particularly usable in the banking sector, in connection with games and/or in the electronic management of documents, characterized in that it comprises:

a mother board (13), having an interfacing bus with one or more standardized connectors to which can be connected standard input/output modules, at least one specific input/output module permitting the performance of specific functions incorporating at least one dedicated circuit, said module as its main function the supplying of the mother board with preorganized informations, in real time, concerning the specific functions and able to leave to said mother board any developed software processing of said informations.

42 Claims, 8 Drawing Sheets

SECURIZED, MULTIFUNCTION, ACQUISITION AND PROCESSING TERMINAL USABLE IN THE BANKING SECTOR, IN CONNECTION WITH GAMES AND IN THE ELECTRONIC MANAGEMENT OF DOCUMENTS

TECHNICAL FIELD

The present invention relates to a multifunction, securized, acquisition and processing terminal usable in the banking sector, in connection with games and in the electronic management of documents.

PRIOR ART

A banking terminal is particularly appropriate for the acquisition of documents, cheques or any other administrative item for current use in a bank. Such a terminal clearly permits the acquisition of any banking form or the like with an area to be marked off, or even only with a writing area.

If such a terminal exists it is either large, or expensive, or has an assembly of often expensive and poorly adapted dissimilar, commercial components and has no direct document acquisition or entry elements.

Therefore the present invention is directed at the provision of a terminal particularly suitable for all these operations (rapid, reliable, etc.), which is securized and has a reduced cost.

Terminals, prior to the present invention, often consist of dissimilar assemblies, having in certain cases several microprocessors associated with one another and/or which usually are not used in a standard architecture, but in so-called "specific intelligent" configurations controlling most of the inputs/outputs. Often they have no scanner, the informations being acquired or entered manually.

Other terminals, prior to the present invention, may have scanners, but suffer from the disadvantage of being virtually specifically developed. Those having a scanner are very expensive, slow, monochromic, have a single face and two grey levels (black and white) and have a very complex implementation.

A particular object of the invention is to provide a direct acquisition means, in particular by means of a fast, simple or double face and/or colour scanner having an extensive range of levels, as well as excellent resolution, both for horizontal and vertical definition and with respect to colour levels associated with an excellent linearity, more particularly as a result of a specific circuit used in the subsequently described, so-called "specific" part.

The present invention is mainly directed at reducing said specific part to its strict minimum and also using to the greatest possible extent standard, commercial components so as to make the resulting terminal compact, inexpensive, reliable and simple to implement.

DESCRIPTION OF THE INVENTION

The present invention proposes a securized, multifunction, acquisition and processing terminal more particularly usable in the banking sector, in the field of games and/or in the electronic management of documents and characterized in that it comprises inter alia:

a mother or main board based on at least one commercially available microprocessor (e.g. Pentium or P6 (Intel trademark), Power PC (Motorola registered trademark) or CISC (Complex Instruction Set Computer) or RISC (Reduced Instruction Set Computer)), in particular having an interfacing bus with one or more connectors of a standardized nature and to which can be connected standard input/output modules, at least one specific, input/output module making it possible to perform specific functions, incorporating at least one dedicated circuit, the main function of said module being to supply preorganized informations to the mother board, in real time, concerning the specific functions and able to leave to said mother board any developed software processing of said informations.

In a first embodiment, said modules are located on the same board, including the standard microprocessor or microprocessors, the bus or buses, and the auxiliary inputs/outputs, said board being substituted for the mother board.

In a second embodiment, the modules form separate boards, the mother board being standard.

Advantageously, the specific functions comprise at least one scanner and its associated management or control, a chip card reader, a securizing chip reader, a magnetic track card reader, an optical reader, as well as at least one liquid crystal display (LCD), at least one tactile or non-tactile keypad or keyboard, the flash memory and its management, the static random access memory (SRAM), an ink jet, thermal or other printer, a light pen or wand, a tactile surface and its management.

Advantageously, the terminal is located in an parallelepipedic box, formed from the connection of an upper part and a lower part and in which is located a standard mother board to which can be connected the daughter boards by means of the standard bus.

Advantageously the boards connected to the standard bus are located in a detachable, electromagnetic, shielding tray, subdivided into several compartments by detachable partitions, each board being easily insertable into one of said compartments. Said tray is formed from several elements, namely a main element, a first face having openings permitting the passage of the input/output connectors of said boards, a second face cut in such a way as to leave space for the mother board connectors, a third face of said tray being formed by the lower part of the box forming a detachable door giving easy access for any board change or manipulation.

Advantageously, said box has a lateral access door permitting the passage of connecting cables, at the rear of the terminal, for any connection with a printer, a network, etc.

Advantageously, said box also contains at least one power supply, at least one hard disk reader and at least one floppy disk reader.

Advantageously, said box also has jointly a LCD, a magnetic track and/or optical reader, a touch and/or tactile keypad, a scanner, a chip card reader, a securizing chip reader, a pocket computer memory card interface adaptor (PCMCIA) and a stop-go button. Advantageously, all these elements are detachable.

In an advantageous embodiment, the LCD has a sensitive, tactile surface, which can be added to the keypad. This sensitive surface, due to the almost infinite display possibilities of the LCD, permits the implementation of any type of touch or acquisition, e.g. a graphic acquisition. It permits the location of any point of the display and permits the performance of any adequate processing.

The LCD is advantageously fixed to the box with the aid of a mobile means, e.g. about two rotation axes, which inter alia makes it possible to have in the closed position said display located on the upper face of the box and consequently protected and in the open position said display in the regulatable, oblique position permitting an easy reading by the user.

In a constructional variant the display is fixed to the rear face of the box by means rendering it mobile and permitting its protection in the closed position.

The elongated magnetic track reader advantageously has a slide in which can be read by sliding a magnetic card. An optical reader can also be located in the same slide.

The touch or tactile keypad or keyboard is advantageously formed by a metal fitting against which is placed a printed circuit having keys. This keypad is easily detachable and can be a completely independent module, being protected by a tight membrane.

Advantageously the scanner is a front and/or back scanner and/or colour scanner, which is elongated and relatively small. Its diameter is advantageously below 60 mm. It can easily be detached and can be a completely independent module.

Advantageously, the scanner has at least one contact image sensor (CIS), or no contact image sensor (NCIS) and/or charge coupled device (CCD).

The terminal advantageously has a tray for receiving documents following reading by the scanner.

In a constructional variant the magnetic track reader and/or optical reader, the securizing chip reader and the chip card reader are located in the same assembly as the keypad. The single printed circuit then advantageously controls either the keypad, or the reader or readers, or the display or displays, or everything.

The keypad then advantageously has an optical and/or electrical connection to the scanner, an optical and/or electrical connection to the display and an optical and/or electrical connection to the box. The optical connection or link is either by fibre optics, or in air by means of light emitting diodes and photosensitive sensors, such as a remote control.

According to another variant, the scanner and LCD are connected across the keypad and its readers. The keypad, scanner and LCD are also detachable, so that the terminal is highly modulatable. It is then possible to disengage each of these elements and arrange them at random. The keypad is then connected by a single optical and/or electrical connection to the standard processing part.

Advantageously, a plastic or similar cover is positioned above the box. This cover has a detachable part giving access or rendering detachable the scanner, as well as lateral access door giving access to the input/output connectors of the boards located in the tray.

Advantageously, the box is a standardizable box by means of the thus formed modular electromagnetic shielding.

In a variant each board has its own shielding.

Advantageously, the terminal according to the invention is securized. The dedicated circuit can perform internally and therefore confidentially any encrypting-decrypting, confidentiality and compressing-decompressing algorithm. The encrypting-decrypting, confidentiality and/or compressing-decompressing function is performed by a chip card chip integrated in the dedicated circuit. In a variant said chip can be placed jointly with the dedicated circuit and not in the dedicated circuit. Advantageously, compression-decompression is separated from confidentiality.

Therefore the terminal according to the invention has the following advantages:

it uses a standard mother board using standard, commercial microprocessors, e.g. Pentium and derivatives, Power PC and derivatives, RISC, CISC or other architecture, it uses a standardized interfacing bus, it has a developing configuration permitting auto-configuration or plug and play.

Unlike the prior art terminals, the terminal according to the invention, apart from the mother board and peripheral boards, has at least one dedicated board, without standard or commercial microprocessor, but with at least one dedicated circuit (ASIC) permitting the performance of the specific functions of the terminal, so that the developed software processing can be left to the mother board.

In summarizing, addition only takes place to the terminal according to the invention of a specific input/output board, the costs being less than for a so-called intelligent card or board.

Advantageously, the terminal according to the invention is usable in the banking sector, in connection with games and/or the electronic management of documents.

DETAILED DESCRIPTION OF EMBODIMENTS

Figure 1A:
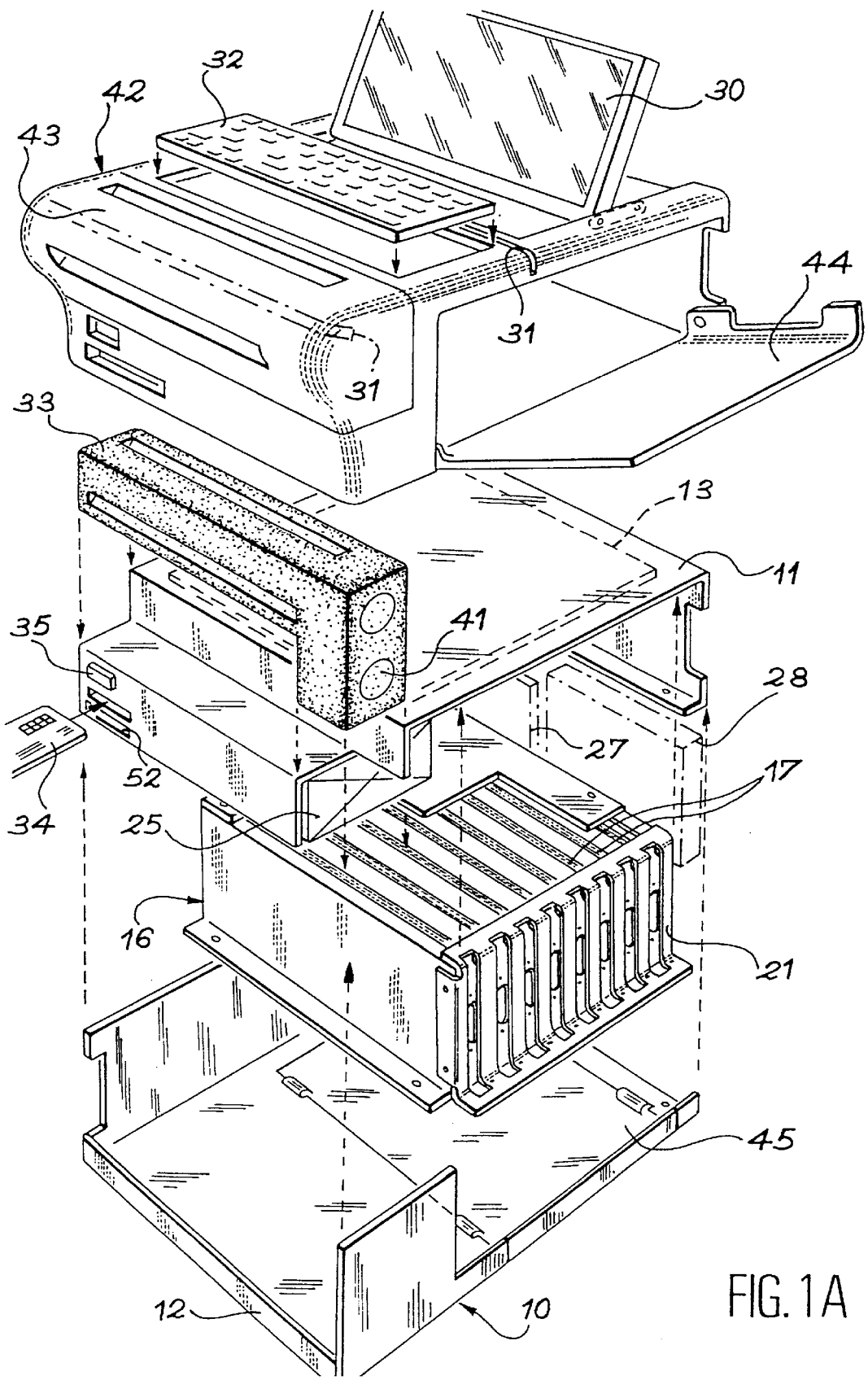
FIG. 1A shows an exploded view of the terminal according to the invention.
Figure 1B:
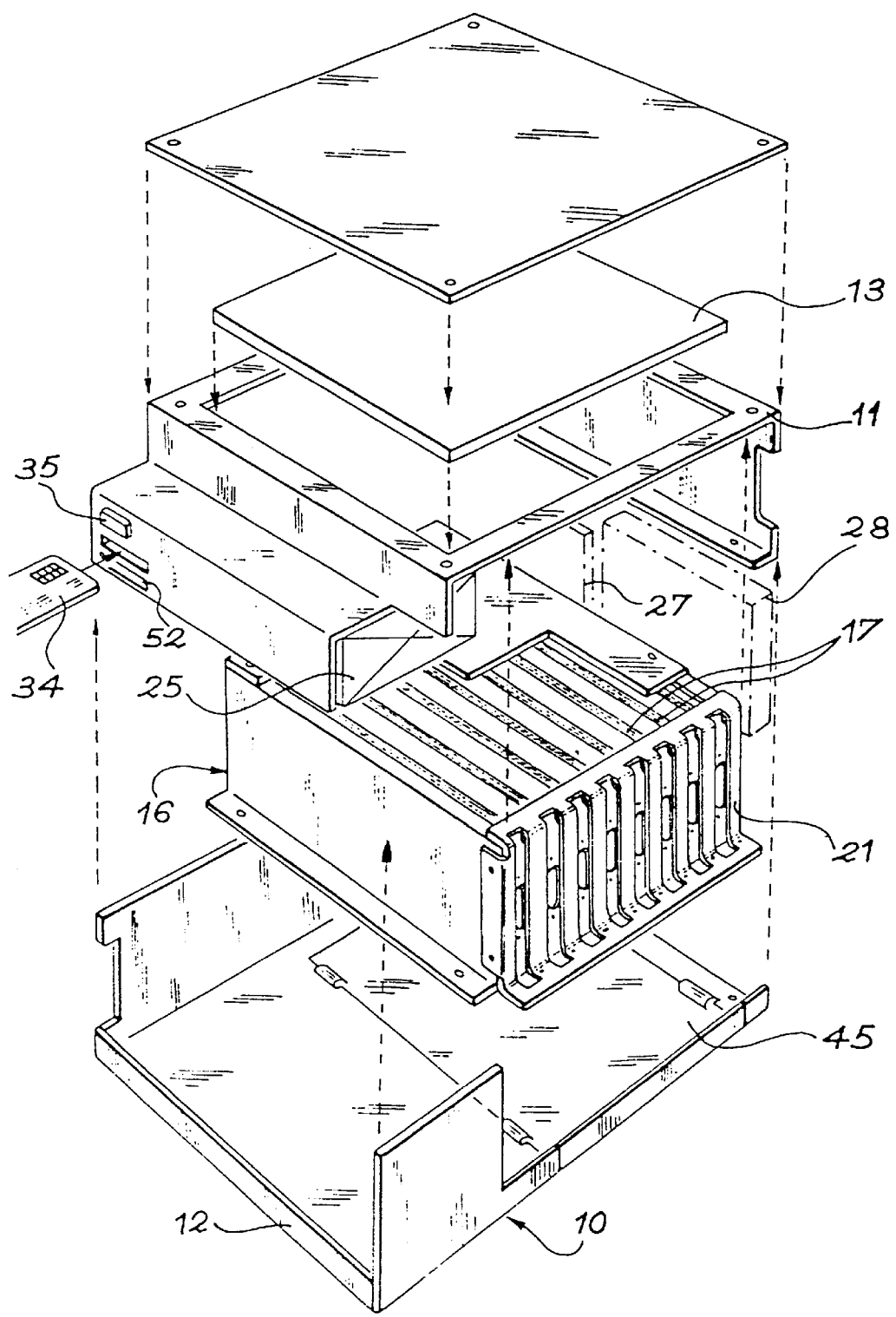
FIG. 1B illustrates an exploded view of a variant of the terminal according to the invention.
Figure 2:
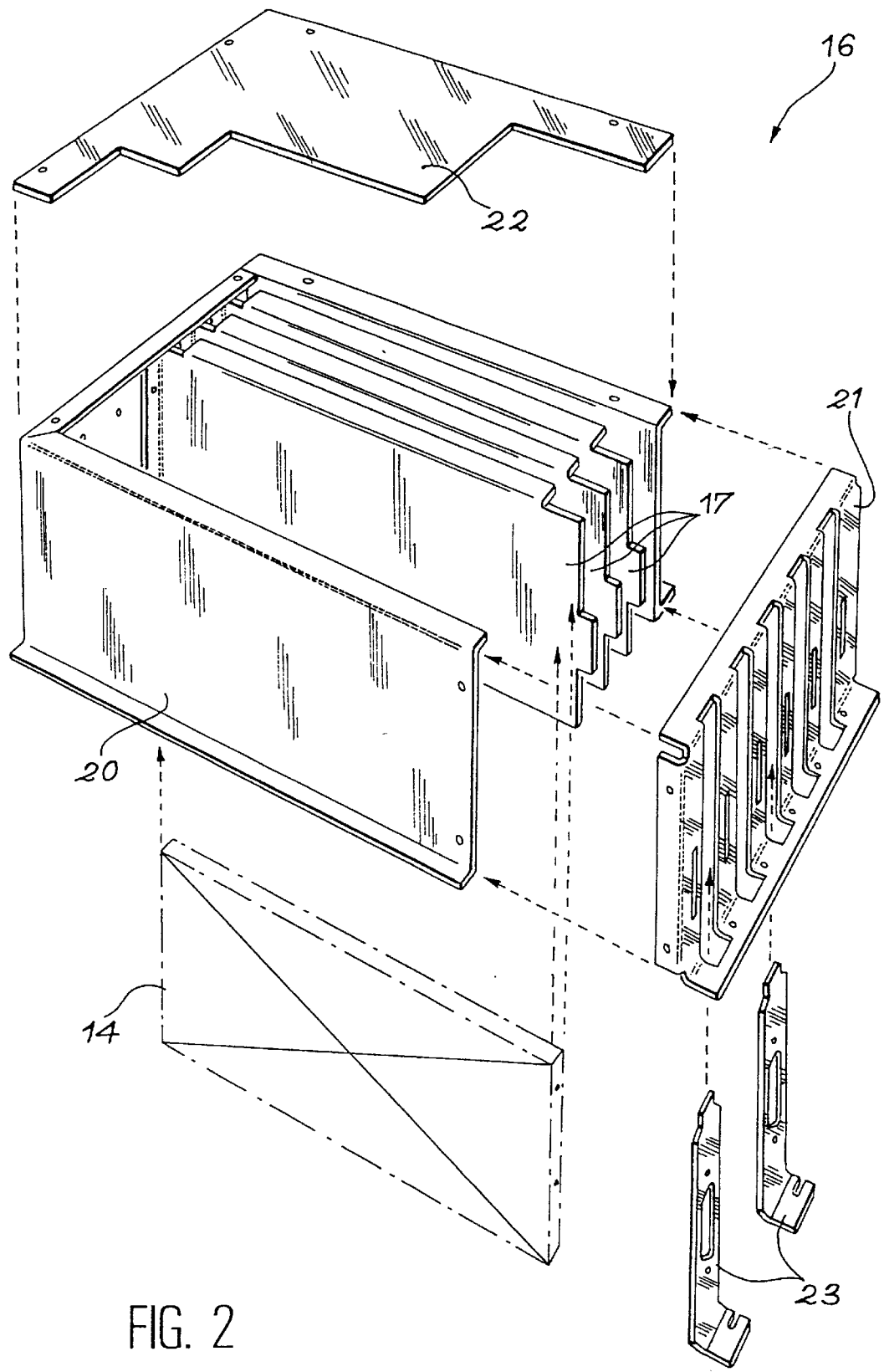
FIG. 2 is an exploded view of part of the terminal according to the invention.
Figure 3:
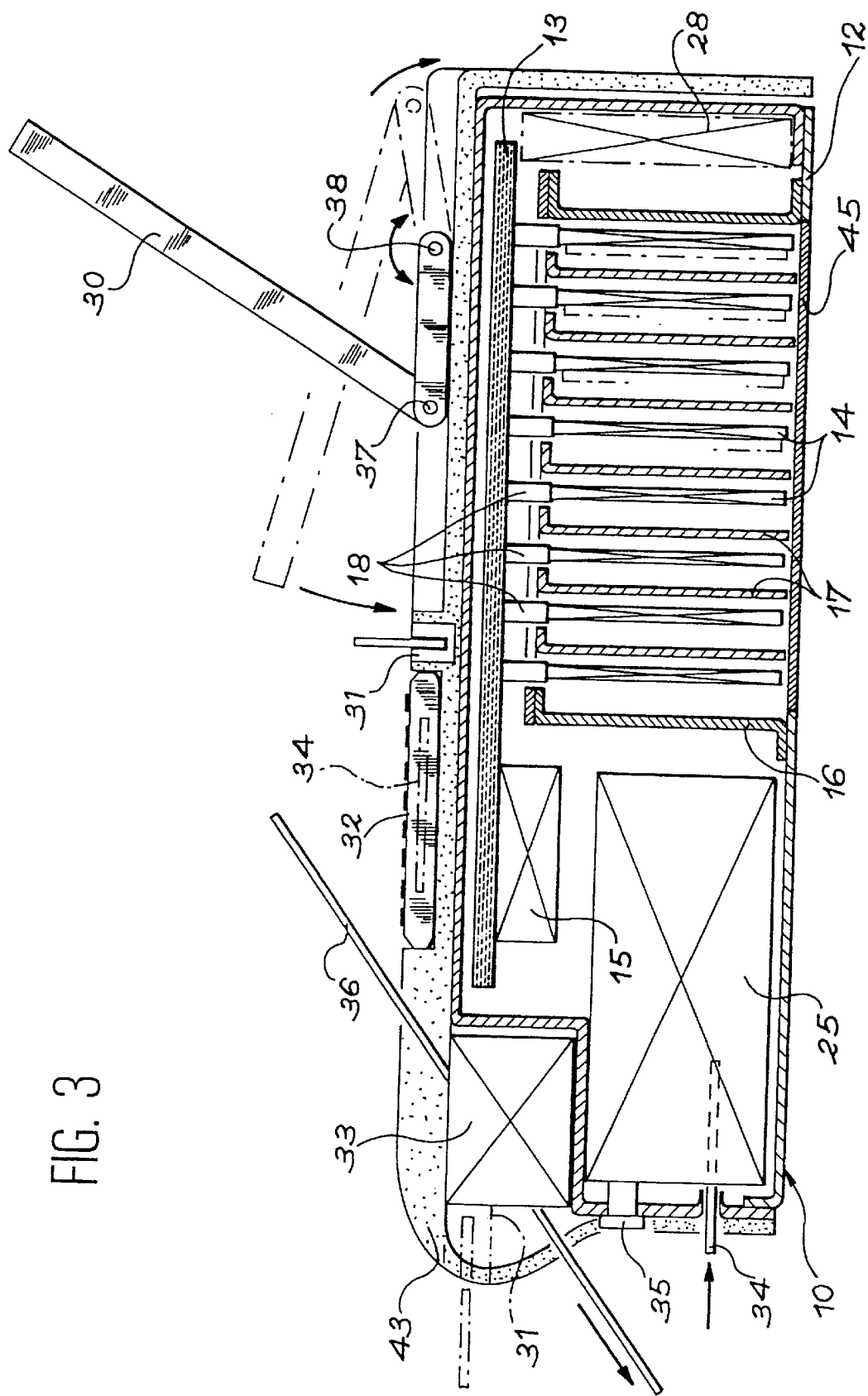
FIG. 3 illustrates a longitudinal sectional view of the terminal according to the invention.

As shown in FIGS. 1 to 3, the terminal according to the invention comprises a parallelepipedic box 10, which is formed from a connection of an upper part 11 and a lower part 12. Said box 10 contains a mother or main board 13, with the corresponding circuits 15 (memory, microprocessor, etc.), to which can be connected daughter boards 14 by means of connectors 18.

These daughter boards 14 are located in a detachable or non-detachable, electromagnetic shielding tray 16, subdivided into several compartments by detachable partitions 17, each daughter board 14 being insertable into one of said compartments and is connected to the mother board 13 by a connector 18.

This tray 16 is formed from several elements, namely a main, U-shaped element 20, a front face 21 with openings giving passage to the input/output connectors of the daughter boards 14, an upper face 22 cut so as to give space for the connectors of the mother board, the lower part of the tray 16 being formed by the power part 12 of the box 10, which forms a detachable door 44 giving easy access for any manipulation or change of board 14. The box 10 also contains at least one power supply 25, a hard disk reader 27 and a floppy disk reader 28.

In an embodiment, the hard disk is 2.5 inches and in another embodiment 1.8 inches, but any other type is possible. The same applies for the floppy disk. The interface of these two disks is standard.

The hard disk can also be controlled so as to only function for the minimum possible time due to functions integrated in the terminal. Thus, in the case of a shock or impact, the disk does not rotated and malfunction, e.g. the disk only rotates on changing the various software items and then becomes inoperative, as it does in the evening during the balancing of the day's accounts. For the remainder of the time it does not rotate.

In the terminal according to the invention, the hard disk 27 permits an advantageous, reduced cost extension of the dynamic random access memory (DRAM), FLASH, SRAM or the like.

FIG. 1B is a constructional variant of the terminal according to the invention. The box is cut above the mother board so as to permit the removal of the latter. In this case the terminal is implemented around the tray.

FIG. 2 also shows angle sections 23 permitting the electromagnetic shielding and the fixing of the ends of the daughter boards 14.

On the upper surface of said box 10 are located a LCD 30, a magnetic track reader 31, a touch or tactile keypad or keyboard 32, a scanner 33 and a PCMCIA reader 52.

On the front face of the box are located a chip card reader 34, a stop-go button 35 and optionally a chip card reader (PCMCIA).

In another variant, the LCD is covered with a tactile, sensitive sensor, which may or may not be added to the keys of the keypad.

Figure 4:
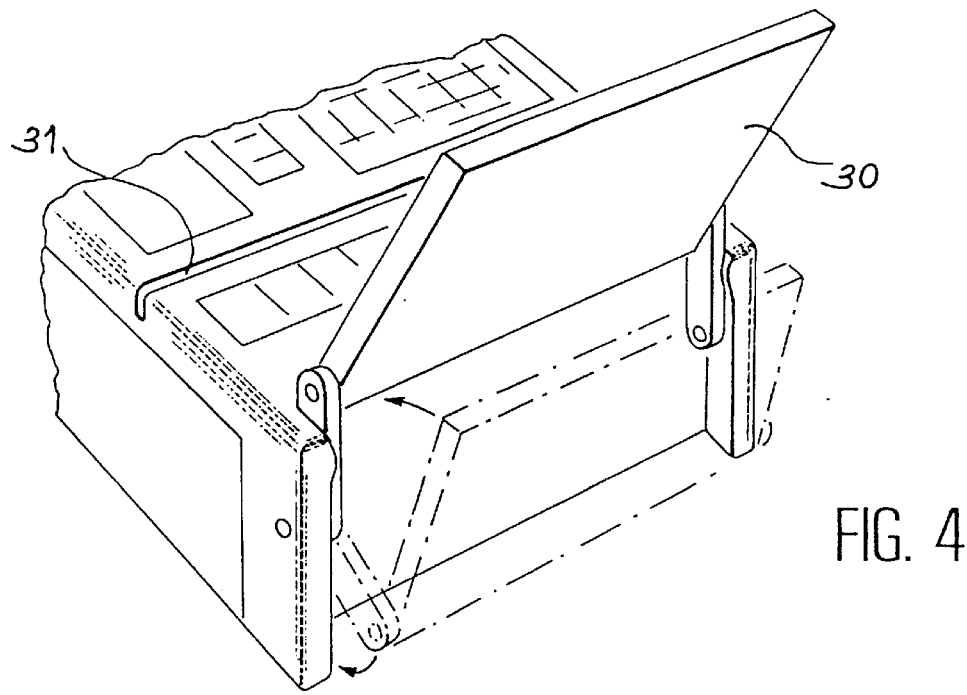
FIG. 4 illustrates a positioning variant for the LCD.

The LCD 30 is fixed to the box with the aid of a flexible means, e.g. around two rotation spindles or axes 37, 38, which makes it possible to obtain in the closed position the said display located on the upper surface of the box so that it is protected, whereas in the open position said screen has a regulatable, oblique location giving easy access for the user. In a variant, the LCD 30 is fixed to the rear face of the box by means making it mobile and enabling it to be protected in the closed position, as shown in FIG. 4.

The elongated, magnetic track reader 31 has a slide 40 in which can be read by sliding a magnetic card. An optical reader can also be located at any random point of said slide for reading purposes, e.g. bar codes, OCR, etc.

The tactile and/or touch keypad 32 can be formed by a metal fitting on which is placed a printed circuit having keys of the laptop or portable type.

Figure 5:
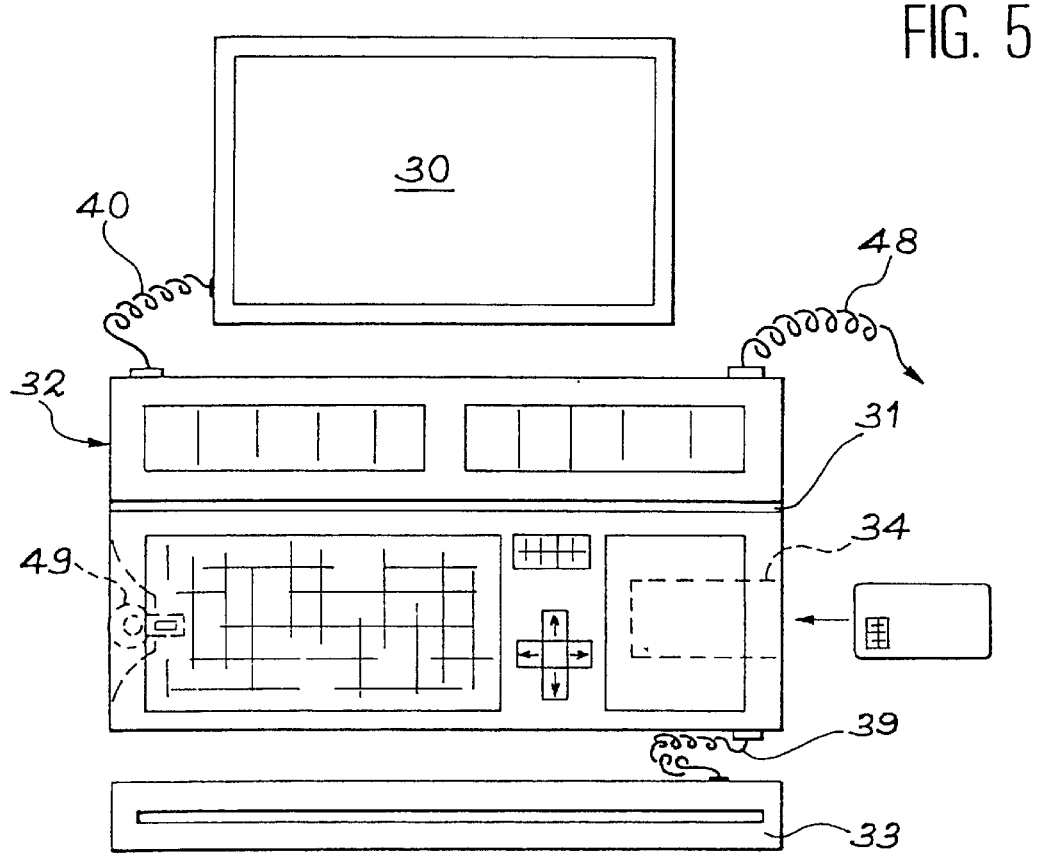
FIG. 5 illustrates a variant of the upper face of the terminal according to the invention.

In a variant, the magnetic track reader 31 and/or optical reader, the chip card reader 34 and the securizing chip reader 49 are integrated in the keypad 32, as shown in FIG. 5.

The keypad can then have at least one optical and/or electrical connection 39 to the scanner 33 and at least one optical and/or electrical connection 40 to the display 32. There is only one electrical and/or optical connection 48 to the box 10. The elongated scanner 33 has a motor 41, which moves the document 36 to be read.

In a variant of the motor 41 of the scanner 33 it is located in the extension of the scanner and not below it. Therefore the scanner is elongated, approximately 30 cm long with a diameter of approximately 60 mm, round or multifacet, or multifacet with rounded angles.

A cover 42 is placed above the box 10 and has a detachable part 43 permitting the mobility of the scanner 33, as well as a lateral access door 44, giving access to the connection system of the daughter boards 14. The stop-go button 35 may or may not allow the supply of the terminal according to the invention.

Figure 6:
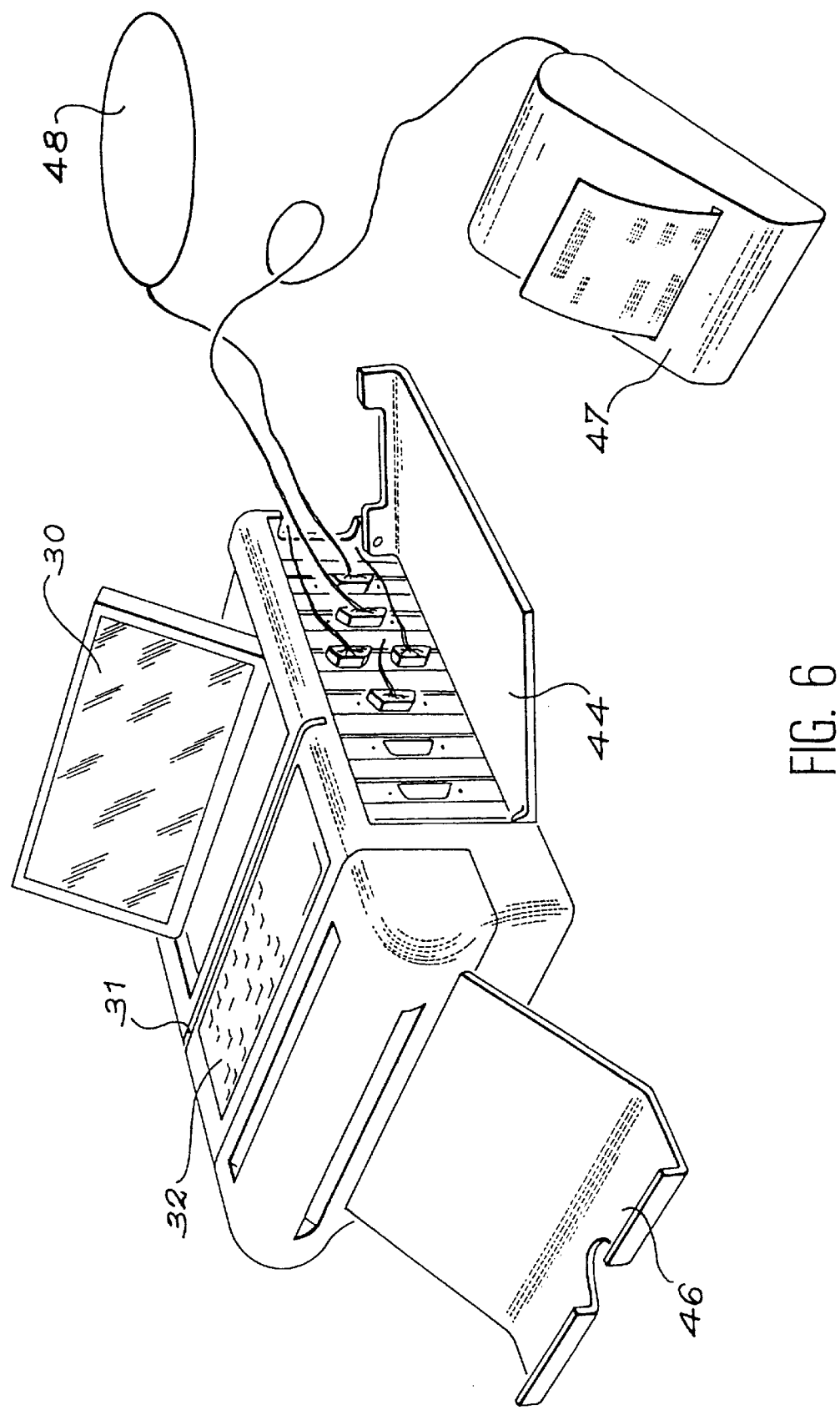
FIG. 6 illustrates an operating example of the terminal according to the invention.

FIG. 6 illustrates an operational example of the terminal according to the invention. A reception tray 46 receives the documents following reading by the scanner 33. The lateral access door 44 permits the passage of the connecting cables to the rear of the terminal for any connection, e.g. to a printer 47, a network 48, etc.

Figure 7:
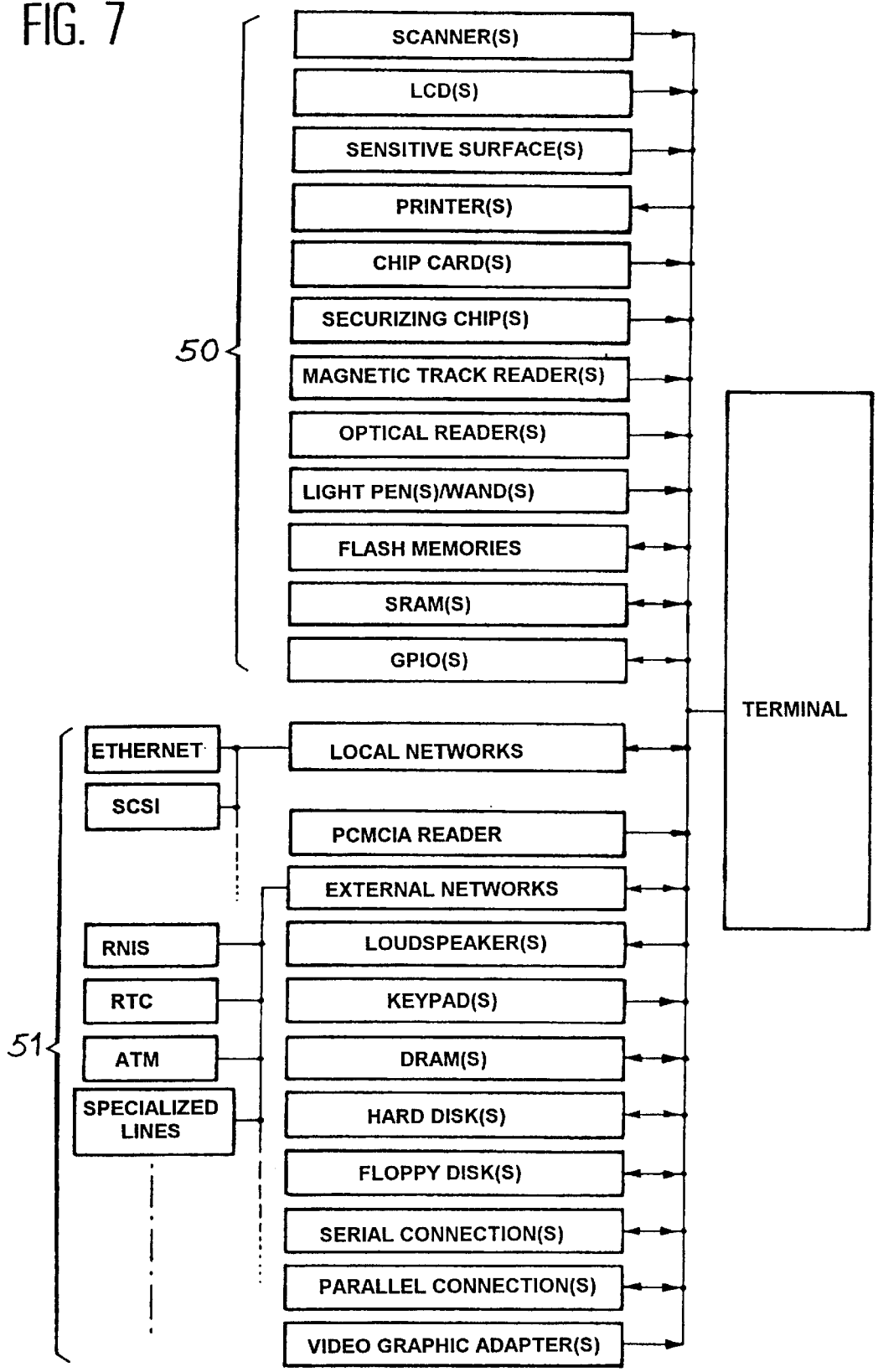
FIG. 7 illustrates the specific functions and standard functions of the terminal according to the invention.

As shown in FIG. 7, the specific functions of the banking terminal according to the invention equipped with at least one board comprising at least one specific circuit are:

scanner, chip card reader, securizing chip reader, magnetic card reader optical reader,

LCD, tactile display, rapid, thermal, ink jet or other printer connected to the terminal, light pen or wand, general purpose input/output (GPIO), e.g. for controlling the opening or closing of a drawer, serial connections and/or parallel connections, one or more Flash memories (Intel registered trademark), one or more static random access memories (SRAM).

However, the standard functions 51 are:

local networks (Ethernet, SCSI), external networks, namely RNIS, RTC, ATM, LS, X25-type protocol (CCITT standard for the transmission of signals in bursts), X21 (CCITT standard for the transmission of signals in bursts), etc., a loudspeaker, a touch and/or tactile or not keypad, one or more dynamic RAMs, the hard disk reader, the floppy disk reader, the serial connections (RS 232, EIA standard), parallel connections, the video graphic adapter (VGA) function, a PCMCIA reader.

The specific functions form the object of the implementation of a dedicated integrated circuit of the ASIC type, which manages all the informations of said functions and which supplies them to the mother board. The PCMCIA function can either be specific or standard.

Figure 8:
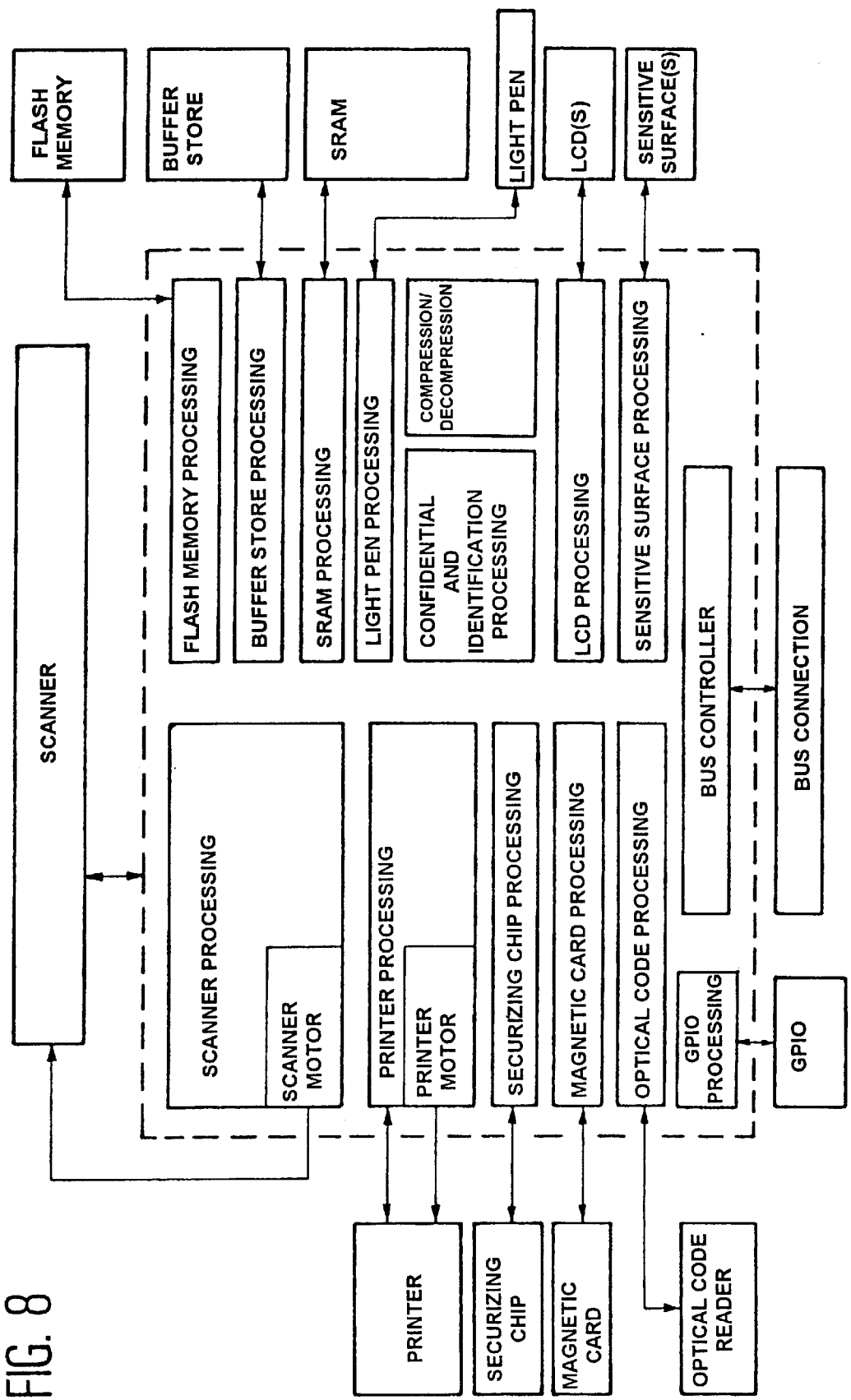
FIG. 8 is an operational block diagram of the dedicated board of the terminal according to the invention.

As shown in FIG. 8, the dedicated circuit in particular has the processing modules respectively connected to each of the specific functions, plus the connection to the standard part.

The terminal permits a high degree of security as a result of its dedicated circuit. Thus, no part of the specific functions of the terminal can be performed without this circuit.

However, very complex codes or functions (e.g. polynomials or the like, RSA, data encryption standard (DES), etc.), can be injected on request and then implemented in the dedicated circuit in all confidentiality. This feature can e.g. be used for encrypting, decrypting internal software of the terminal or all or part of the data flowing through said terminal.

In another embodiment, the securizing chip is replaced by a chip card type chip installed either in the dedicated circuit, or jointly. This chip then makes it possible to personalize and confidentialize all or part of the internal informations, or which pass through the terminal.

All the other standard functions 51 can be implemented by commercially available, standard daughter boards connected to the mother board.

The box 10 associated with the terminal according to the invention is a directly standardizable box as a result of the thus obtained electromagnetic shielding and which is necessary for such a terminal.

Each daughter board 14 has a shielded compartment allocated to it. This shielded compartment is detachable and the compartments are individual or collective. The individual shieldings or any shielding can be removed and are of a modular nature.

In a variant, it is possible to use one or more boards having its own shielding. In this case, removal takes place of one or more partitions used for the shielding of the tray.

Such a box 10 permits easy maintenance, because each board is accessible without the detachment thereof from the terminal and a door 45 can be provided for this purpose.

In addition, each subassembly, namely scanner, LCD, card reader or printer of said terminal is modular and can be individually removed in order to form an exploded terminal.

In an embodiment, the banking terminal according to the invention has the approximate dimensions 28×28×10 cm. The scanner is then located in a cylinder with a diameter smaller than 60 mm. The electromagnetic shielding material is metallic and at least one component is magnetizable.

In another embodiment, the specific and standard functions are implemented on the same board taking the place of the mother board.

We claim:

1. A securized, multifunction, acquisition and processing terminal comprising:

a mother board having circuits connected to a processor and having an interfacing bus with at least one connector;

at least one standard input/output module;

at least one specific input/output module for managing specific functions and incorporating at least one dedicated circuit, said at least one specific module supplying the mother board with preorganized information, in real time, concerning the specific functions and leaving to said mother board any advanced software processing of said information;

at least one daughter board connected to the mother board by said at least one connector;

at least one power supply connected to power the terminal;

a hard disk reader;

a floppy disk reader;

other system modules comprising a LCD, a magnetic track reader, a keypad, an optical reader, an image scanner, a PCMCIA reader, and a chip card reader;

a box containing the mother board, said at least one daughter board, said at least one power supply, the hard disk reader and the floppy disk reader, and supporting the other modules;

an electromagnetic shielding tray subdivided into several compartments by detachable partitions, each of said at least one daughter board being inserted into one of said compartments, said tray being formed from a main element, a front face with openings allowing access to input/output connectors of said at least one daughter board, an upper face cut so as to give space for said at least one connector of the mother board, a lower part of the tray being formed by a lower part of the box, which forms a detachable door.

2. The terminal according to claim 1, wherein all the modules are located on a single board.

3. The terminal according to claim 1, wherein the modules comprise separate daughter boards for each module, connected to the mother board.

4. The terminal according to claim 3, wherein the specific functions comprise one or more of the following modules: the scanner, the chip card reader, an information securizing chip reader, the magnetic track reader, the optical reader, the LCD, the keypad, a printer, a Flash memory, SRAM, a light pen, and a tactile surface.

5. The terminal according to claim 1, wherein signals and connectors of the daughter boards are standardized.

6. The terminal according to claim 1, further comprising a lateral access door for the passage of connecting cables to the rear of the terminal for any connection.

7. The terminal according to claim 1, wherein the LCD has a tactile or non-tactile, sensitive surface.

8. The terminal according to claim 7, wherein said sensitive surface makes it possible to locate any random point of the display and performs any processing necessary for locating the point.

9. The terminal according to claim 1, wherein the magnetic track reader is elongated and has a slide for sliding a magnetic card to be read.

10. The terminal according to claim 9, wherein an optical reader is located in the slide.

11. The terminal according to claim 9, wherein the slide forms part of the keypad.

12. The terminal according to claim 1, wherein the keypad is formed by a metal fitting on which is deposited a printed circuit having keys.

13. The terminal according to claim 12, wherein the keypad printed circuit manages the keypad, at least one of readers, and the LCD.

14. The terminal according to claim 1, wherein the keypad is protected by a tight membrane.

15. The terminal according to claim 1, wherein the scanner is elongated and has overall dimensions fitting within the box.

16. The terminal according to claim 1, wherein the scanner is comprised of a cylinder having a diameter less than 60 mm.

17. The terminal according to claim 1, wherein the scanner is a front and/or back scanner.

18. The terminal according to claim 1, wherein the scanner is a black and white and/or color scanner.

19. The terminal according to claim 1, wherein the scanner comprises at least one sensor that is a contact image sensor or no contact image sensor.

20. The terminal according to claim 1, wherein the scanner comprises at least one charge coupled device.

21. The terminal according to claim 1, comprising a tray for receiving documents after reading by the scanner.

22. The terminal according to claim 1, wherein the scanner is generally cylindrical, approximately 30 cm long, with a diameter of approximately 60 mm, the cylinder round, being multifaceted, or multifaceted with rounded angles, a motor of the scanner being located in an extension thereof.

23. The terminal according to claim 1, wherein the LCD, the magnetic track reader, the optical reader, the keypad, the scanner, the chip card reader, and at least one information securizing chip reader, are detachably fixed to said box.

24. The terminal according to claim 1, wherein a stop-go button is fixed to said box.

25. The terminal according to claim 1, wherein the magnetic track reader, the optical reader, the chip card reader, and an information securizing chip reader form part of a same subassembly as the keypad.

26. The terminal according to claim 25, wherein the keypad has at least one connection to the scanner, at least one connection to the display and at least one connection to the box.

27. The terminal according to claim 26, wherein the connections are optical by fiber optics, or in air by means of light emitting diodes and photosensitive sensors.

28. The terminal according to claim 1, wherein the electromagnetic shielding material is a metallic material, whereof at least one component is magnetizable.

29. The terminal according to claim 1, wherein information transfers are securized.

30. The terminal according to claim 29, wherein securizing is brought about by means of the dedicated circuit, so as to permit the internal and confidential execution of any encrypting/decrypting, confidentiality, or compressing-decompressing.

31. The terminal according to claim 29, wherein encrypting/decrypting, confidentiality and compressing/decompressing security functions are performed by a chip card type chip integrated into the dedicated circuit.

32. The terminal according to claim 31, wherein the specific functions include a smart card type chip separate from the dedicated circuit.

33. The terminal according to claim 29, wherein compression-decompression is separate from confidentiality.

34. A terminal according to claim 1, wherein the dedicated circuit is used for encrypting/decrypting information flowing through the terminal.

35. Terminal according to claim 1, in which:

the magnetic track reader, the optical reader, the keypad and the scanner are located on an upper surface of the box;

the chip card reader and the PCMCIA reader are located on the upper surface or on a front face of the box;

the LCD is fixed on the upper surface or on a rear surface of the box by flexible means such that in a closed position the LCD is located on said surface of the box so that the LCD is protected, whereas in the open position said LCD has a variable oblique position giving easy access to the user.

36. Terminal according to claim 1, further comprising a cover, placed above the box, having a detachable part permitting the mobility of the scanner and a lateral access door giving access to connectors of the daughter board.

37. Terminal according to claim 1, wherein the main element of the electromagnetic shielding tray has a base having a first end and a second end, and a pair of sides arranged generally perpendicular to the base, a first end of one of the sides connected to the first end of the base and a first end of the other side connected to the second end of the base, the detachable partitions each having a first end and a second end, the first end of the partitions connected to the base between the first end of the base and the second end of the base, the partition, arranged generally perpendicular to the base.

38. Terminal according to claim 37, wherein the front face has a first end and a second end, the first end of the front face connected to a second end of one of the sides and the second end of the front face connected to a second end of the other side so that the front face is generally parallel to the base.

39. Terminal according to claim 37, wherein the second ends of the partitions each define a tab and the front face defines a plurality of slots, the tabs being received in the slots.

40. Terminal according to claim 1, wherein each opening in the front face receives an angle section.

41. Terminal according to claim 1, wherein the specific functions managed by the specific input/output module are banking functions.

42. Terminal according to claim 41, wherein the banking functions are data acquisition of banking documents and performance of security functions.

* * * * *